(No Model.)
J. R. WILCOX.
WATER LEVEL INDICATOR.
No. 337,910. Patented Mar. 16, 1886.
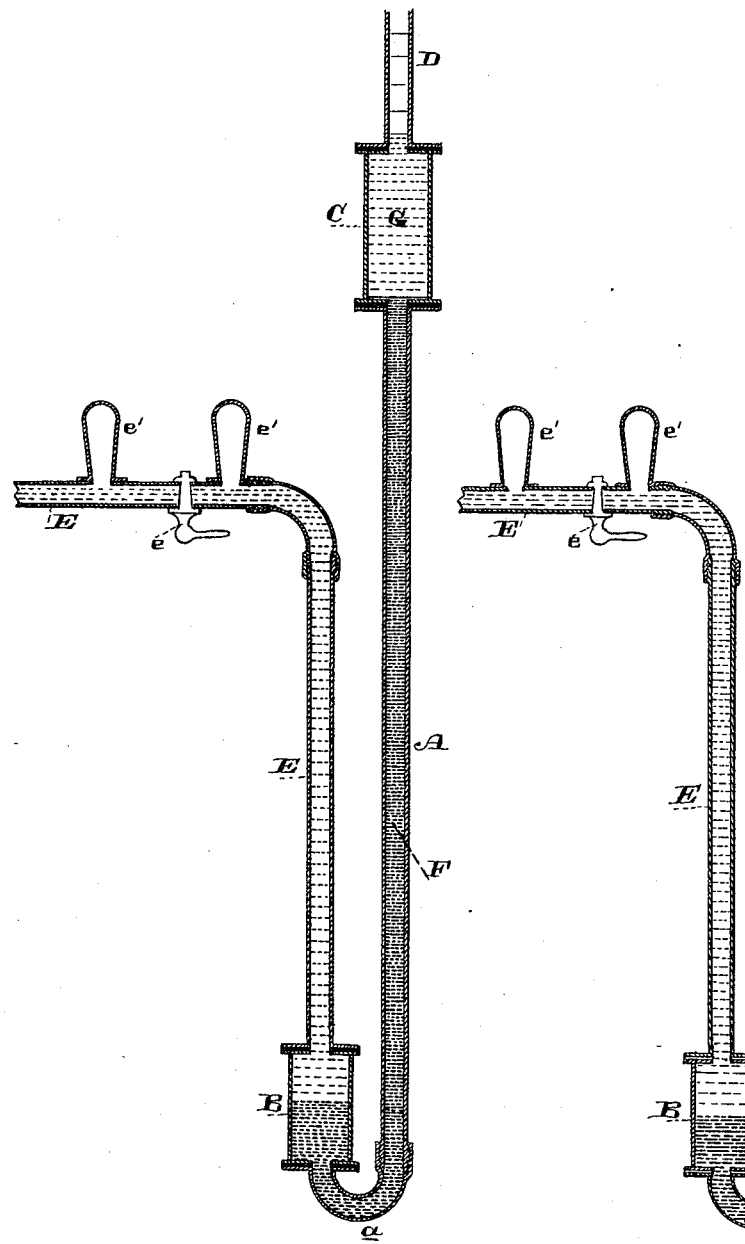
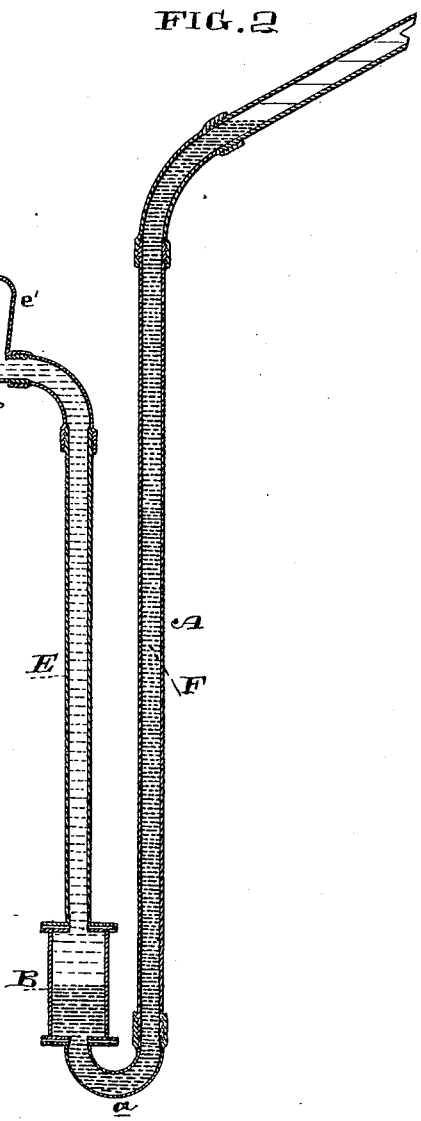

UNITED STATES PATENT OFFICE.

JOSEPH R. WILCOX, OF SAN FRANCISCO, CALIFORNIA.

WATER-LEVEL INDICATOR.

SPECIFICATION forming part of Letters Patent No. 337,910, dated March 16, 1886.

Application filed July 18, 1885. Serial No. 172,015. (No model.)

*To all whom it may concern:*

Be it known that I, JOSEPH R. WILCOX, of the city and county of San Francisco, State of California, have invented an Improvement in Water-Level Indicators; and I hereby declare the following to be a full, clear, and exact description of the same.

My invention relates to a new and useful device for indicating the level of water in a reservoir; and my invention consists of a tube or pipe containing quicksilver. It is bent at its lower end and provided with an enlarged chamber, with the top of which the water main or pipe therefrom connects. At its other end it has an enlarged chamber, with which a graduated glass tube of small diameter communicates, said enlarged chamber and graduated tube containing water.

The object of my invention is to provide a means for accurately and conveniently indicating, in an apartment or place at a point much lower than a distant reservoir, the level of water in said reservoir, and to make the indications very plain or discernible.

Referring to the accompanying drawings, Figure 1 is a vertical section of my indicator. Fig. 2 is a modification of same.

A is a tube or pipe, bent at its lower end at *a*, and provided with an enlarged chamber, B, which may be formed with the pipe, or, as is preferable, may be a separate piece, into which the pipe is screwed through the intervention of a suitable reducer. At the upper end of the pipe is formed or secured an enlarged chamber, C, in the top of which a tube, D, of small diameter is let, said tube being graduated, as shown.

E is a pipe connected with the water-main from the reservoir, and also connected with the top of the chamber B. A cock, *e*, is placed in this pipe, and air-chambers *e'* are fixed on either side of the cock, to obviate the throbbing of the pumping machinery usually employed in connection with the water-service.

In the pipe A and chamber B is placed quicksilver, (represented by F,) in such quantity that the pressure upon it in the chamber B will never be sufficient to force it entirely out of said chamber.

In chamber C is placed a body of water. (Represented by G.)

The operation of the indicator is as follows: The water from the main, when the cock is slightly open, passing through the pipe E, bears upon the top of the quicksilver in the chamber B and raises the column in the pipe A, forcing it up into the chamber C, and the water in said chamber is raised by the quicksilver into the graduated tube D.

The dimensions of the various pipes and chambers are so regulated that the water in the tube D will indicate the level of the water in the distant reservoir, and the quantity of indicating water and quicksilver is so regulated that when the level in the reservoir is lowest the quicksilver will just rise to the base of the chamber C, and the water will completely fill said chamber.

The object of the chamber B at the bottom is to provide a receptacle for a sufficient quantity of quicksilver to prevent the pressure of water from acting from underneath, as in such case the water would simply pass through the quicksilver; but in the chamber B, which contains some quicksilver, no matter how high the level of the water may be, the pressure is always on its top.

It will be observed that the body of quicksilver (practically unaffected by the superposed water, which is so much lighter) is subject to the level of the water in the distant reservoir, and rises in accordance with that pressure exactly to the same height, whether in a pipe of the same or different diameters, and while thus rising in the chamber C to a given height, to balance the pressure, it is obvious that a greater quantity flows into said chamber by reason of its greater diameter, and therefore displaces a like quantity of water, which is sufficient to cause an increased and more discernible rise of the water in the graduated tube D of smaller diameter. This action of the quicksilver, as before stated, is not impaired or changed by the water, the weight of which is so much lighter as not to affect appreciably the balancing function of the quicksilver. The object, therefore, of the chamber C is to contain sufficient water for the purpose, and also to provide for the displacement of a sufficient quantity to indicate in the tube D the level of the water in the reservoir in more increased distances or movements than the quicksilver alone would do.

As the operation of my invention is dependent upon the use of liquids of different specific gravities, it is obvious that I need not confine myself to the use of quicksilver and water, but may use other liquids of different specific gravity. I use quicksilver because, having a very great specific gravity, I am enabled to reduce the distance of movement, and I use water because it is available and light.

If desirable, I could modify my apparatus by omitting the chamber C and tube D and bending the top of the main pipe A at an angle, making it of glass, and graduating it, as shown in Fig. 2, so that the quicksilver will not have to be raised any higher, but will still flow in the inclined top of the pipe a greater distance, enabling more accuracy of the readings.

Having thus described my invention, what I claim as new, and desire to secure by Letters Patent, is—

1. A water-level indicator comprising the tube or pipe A, having a bent lower end, the enlarged chamber B on its lower end, with the top of which the main or pipe from the reservoir communicates, the enlarged chamber C on its upper end, the graduated tube D, of small diameter, let into the top of said chamber, a liquid of great specific gravity—such as quicksilver—F, in chamber B and tube A, and a liquid of less specific gravity—such as water—G, in the chamber C, substantially as herein described.

2. A water-level indicator comprising tube or pipe A, having an upwardly-bent lower end and an inclined graduated upper end, an enlarged chamber, B, on the lower end, with the top of which the main or pipe from the reservoir communicates, and the quicksilver, F, in the chamber B and the tube or pipe A, substantially as herein described.

In witness whereof I have hereunto set my hand.

JOSEPH R. WILCOX.

Witnesses:
S. H. NOURSE.
C. D. COLE.